(12) United States Patent
Kojima

(10) Patent No.: US 10,453,064 B2
(45) Date of Patent: Oct. 22, 2019

(54) DEVICE SECURITY MANAGEMENT APPARATUS, FINANCIAL PROCESSING SYSTEM, DEVICE SECURITY MANAGEMENT METHOD, AND PROGRAM

(71) Applicant: LAUREL BANK MACHINES CO., LTD., Tokyo (JP)

(72) Inventor: Kenji Kojima, Tokyo (JP)

(73) Assignee: LAUREL BANK MACHINES CO., LTD., Tokyo (JP)

( * ) Notice: Subject to any disclaimer, the term of this patent is extended or adjusted under 35 U.S.C. 154(b) by 431 days.

(21) Appl. No.: 15/254,115

(22) Filed: Sep. 1, 2016

(65) Prior Publication Data
US 2017/0076294 A1 Mar. 16, 2017

(30) Foreign Application Priority Data
Sep. 10, 2015 (JP) .................................. 2015-178562

(51) Int. Cl.
*G06K 5/00* (2006.01)
*G06Q 20/40* (2012.01)
(Continued)

(52) U.S. Cl.
CPC ....... *G06Q 20/40145* (2013.01); *G06F 21/32* (2013.01); *H04L 63/0861* (2013.01)

(58) Field of Classification Search
USPC ................................................ 235/375–385
See application file for complete search history.

(56) References Cited

U.S. PATENT DOCUMENTS 7,823,766 B1 * 11/2010 Dittmer .................. G06Q 20/10
235/375
2003/0006280 A1 * 1/2003 Seita .................... G06K 7/0008
235/380
(Continued)

FOREIGN PATENT DOCUMENTS

| CN | 1810205 A | 8/2006 |
|---|---|---|
| CN | 100522058 C | 8/2009 |

(Continued)

OTHER PUBLICATIONS

Extended European Search Report dated Oct. 24, 2016 in European Application No. 16187223.9 (6 pages).
(Continued)

*Primary Examiner* — Jamara A Franklin
(74) *Attorney, Agent, or Firm* — Nixon & Vanderhye P.C.

(57) ABSTRACT

A device security management apparatus includes: a communication unit that communicates with a device, via a network within a building; a memory unit that memorizes biometric information for each of a plurality of operators; a biometric information acquisition unit that acquires biometric information from the device via the communication unit; a biometric authentication unit that compares the acquired biometric information with the memorized biometric information, to identify an operator corresponding to the acquired biometric information; and a device control unit that notifies the device of control information for bringing the device into an operable state in a case where the biometric authentication unit has identified the operator corresponding to the acquired biometric information, and notifies the device of control information for bringing the device into an inoperable state in a case where the biometric authentication unit has not identified the operator corresponding to the acquired biometric information.

16 Claims, 7 Drawing Sheets

(51) Int. Cl.
*G06F 21/32* (2013.01)
*H04L 29/06* (2006.01)

(56) References Cited

U.S. PATENT DOCUMENTS

| | | | |
|---|---|---|---|
| 2003/0140234 A1 | 7/2003 | Noda et al. | |
| 2007/0098223 A1 | 5/2007 | Kamata et al. | |
| 2008/0298647 A1 | 12/2008 | Orr et al. | |
| 2010/0095130 A1 | 4/2010 | Bertran et al. | |

FOREIGN PATENT DOCUMENTS

| | | |
|---|---|---|
| EP | 1 780 657 A2 | 5/2007 |
| JP | 2003-44442 A | 2/2003 |
| JP | 2004-054602 | 2/2004 |
| JP | 2008-21222 A | 1/2008 |
| JP | 2008-257492 A | 10/2008 |
| JP | 2010-026761 | 2/2010 |
| KR | 2002-0089416 A | 11/2002 |
| KR | 10-2004-0075126 A | 8/2004 |
| KR | 10-2007-0009377 A | 1/2007 |
| KR | 10-2007-0106366 A | 11/2007 |
| KR | 10-1112097 B1 | 2/2012 |

OTHER PUBLICATIONS

KIPO Notice of Allowance dated Apr. 30, 2018 in Korean Application No. 10-2016-0115338, with English translation (6 pages).
Office Action of the Intellectual Property Office dated Jul. 14, 2017 in Taiwanese Application No. 105128866 with English Translation (12 pages).
KIPO Notice of Grounds for Rejection dated Jun. 17, 2017 in Korean Application No. 10-2016-0115338 with English translation (17 pages).
The First Office Action dated Dec. 29, 2018 in Chinese Application No. 201610811394.8, with English translation (21 pages).
Notice of Reasons for Rejection dated Mar. 26, 2019 in Japanese Application No. 2015-178562, with English translation, 11 pages.

\* cited by examiner

FIG. 3

| OPERATOR IDENTIFIER | BIOMETRIC INFORMATION TYPE | BIOMETRIC INFORMATION |
|---|---|---|
| UID1 | VEIN | BI1a |
| | FINGERPRINT | BI1b |
| | IRIS | BI1c |
| | ... | ... |
| UID2 | VEIN | NO REGISTRATION |
| | FINGERPRINT | BI2b |
| | IRIS | BI2c |
| | ... | ... |
| ... | ... | ... |

TBL1

| OPERATOR IDENTIFIER | DEVICE IDENTIFIER | OPERATION AUTHORITY |
|---|---|---|
| UID1 | DID1 | ALLOW |
| | DID2 | ALLOW |
| | DID3 | ALLOW |
| | DID4 | ALLOW |
| | ... | ... |
| UID2 | DID1 | DENY |
| | DID2 | DENY |
| | DID3 | ALLOW |
| | DID4 | ALLOW |
| | ... | ... |
| ... | ... | ... |

TBL2

| OPERATOR IDENTIFIER | DEVICE IDENTIFIER | OPERATION AUTHORITY | OPERATION RANKING |
|---|---|---|---|
| UID1 | DID1 | ALLOW | OPERATION RANKING A (SPECIAL) |
|  | DID2 | ALLOW | OPERATION RANKING A (SPECIAL) |
|  | DID3 | ALLOW | OPERATION RANKING B (CLERK) |
|  | DID4 | ALLOW | NO OPERATION RANKING |
|  | ... | ... | ... |
| UID2 | DID1 | DENY | — |
|  | DID2 | DENY | — |
|  | DID3 | ALLOW | OPERATION RANKING C (GENERAL) |
|  | DID4 | ALLOW | NO OPERATION RANKING |
|  | ... | ... | ... |
| ... | ... | ... | ... |

TBL2A

DEVICE SECURITY MANAGEMENT APPARATUS, FINANCIAL PROCESSING SYSTEM, DEVICE SECURITY MANAGEMENT METHOD, AND PROGRAM

BACKGROUND OF THE INVENTION

Field of the Invention

The present invention relates to a device security management apparatus, a financial processing system, a device security management method, and a program.

Priority is claimed on Japanese Patent Application No. 2015-178562, filed Sep. 10, 2015, the content of which is incorporated herein by reference.

Description of Related Art

At financial institutions, in view of preventing leakage of important information such as personal information and/or preventing unauthorized operations, when a customer carries out a transaction (such as cash withdrawal, cash deposit, and fund transfer) at an ATM (automated teller machine), the personal identification number of a card is entered, and/or the biometric information (such as vein pattern) of the operator is scanned, to perform identification confirmation.

Japanese Unexamined Patent Application, First Publication No. 2010-026761 (hereunder, referred to as Patent Document 1) discloses, as a related technique, a technique that enables cash withdrawal to be made upon authenticating teller window operators, in a cash handling system including two teller window operation machines and a single cash handling machine. The two teller window operation machines are provided for left and right teller window operators, and are provided respectively with a teller window operator log-in device. The single cash handling machine is connected to these left and right teller window operation machines, and is shared by these left and right teller window operators.

Japanese Unexamined Patent Application, First Publication No. 2004-054602 (hereunder, referred to Patent Document 2) discloses, as a related technique, a device, to and from which cash deposits and withdrawals can be made without requiring an online connection to be established with a financial institution.

SUMMARY OF THE INVENTION

However, the number of devices used within the premises of financial institutions is high and the types of these devices may vary a lot. Therefore, providing a biometric authentication device in each device in order to increase the level of security may increase implementation cost as well as maintenance load.

An object of the present invention is to provide a device security management apparatus, a financial processing system, a device security management method, and a program, capable of reducing implementation cost and operational load, in order to improve the level of security of devices used within the premises of financial institutions.

A device security management apparatus according to a first aspect of the present invention includes: a communication unit that communicates with a device, via a network within a building in which the security management apparatus and the device are installed, the device being used for financial processing; a memory unit that memorizes biometric information for each of a plurality of operators; a biometric information acquisition unit that acquires biometric information from the device via the communication unit; a biometric authentication unit that compares the acquired biometric information with the memorized biometric information, to identify an operator corresponding to the acquired biometric information; and a device control unit that notifies the device of first control information for bringing the device into an operable state in a case where the biometric authentication unit has identified the operator corresponding to the acquired biometric information, the device control unit notifying the device of second control information for bringing the device into an inoperable state in a case where the biometric authentication unit has not identified the operator corresponding to the acquired biometric information.

A financial processing system according to a second aspect of the present invention includes: a device security management apparatus; and a device that is used for financial processing. The device includes: a transmitting unit that transmits biometric information via a network within a building in which the security management apparatus and the device are installed. The device security management apparatus includes: a communication unit that communicates with the device, via the network within the building; a memory unit that memorizes biometric information for each of a plurality of operators; a biometric information acquisition unit that acquires the biometric information transmitted from the device, via the communication unit; a biometric authentication unit that compares the acquired biometric information with the memorized biometric information, to identify an operator corresponding to the acquired biometric information; and a device control unit that notifies the device of first control information for bringing the device into an operable state in a case where the biometric authentication unit has identified the operator corresponding to the acquired biometric information, the device control unit notifying the device of second control information for bringing the device into an inoperable state in a case where the biometric authentication unit has not identified the operator corresponding to the acquired biometric information. The device further includes: a receiving unit that receives the first control information or the second control information from the device security management apparatus via the network within the building; and an operation state switching unit that brings the device into the operable state in a case where the receiving unit has received the first control information, the operation state switching unit bringing the device into the inoperable state in a case where the receiving unit has received the second control information.

A device security management method according to a third aspect of the present invention is for a device security management apparatus. The method includes: memorizing biometric information for each of a plurality of operators in the device security management apparatus; acquiring biometric information from a device, via a network within a building in which the security management apparatus and the device are installed, the device being used for financial processing; comparing the acquired biometric information with the memorized biometric information, to identify an operator corresponding to the acquired biometric information; notifying the device of first control information for bringing the device into an operable state in a case where the operator corresponding to the acquired biometric information has been identified; and notifying the device of second control information for bringing the device into an inoperable state in a case where the operator corresponding to the acquired biometric information has not been identified.

A program according to a fourth aspect of the present invention is for causing a computer to operate as a device security management device. The program causes the computer to execute: memorizing biometric information for each of a plurality of operators in the computer; acquiring biometric information from a device, via a network within a building in which the computer and the device are installed, the device being used for financial processing; comparing the acquired biometric information with the memorized biometric information, to identify an operator corresponding to the acquired biometric information; notifying the device of first control information for bringing the device into an operable state in a case where the operator corresponding to the acquired biometric information has been identified; and notifying the device of first control information for bringing the device into an inoperable state in a case where the operator corresponding to the acquired biometric information has not been identified.

By means of the device security management apparatus, the financial processing system, the device security management method, and the program of the present invention, it is possible to reduce implementation cost and operational load, in order to improve the level of security of a device connected to the network within the building such as a financial institution.

BRIEF DESCRIPTION OF THE DRAWINGS

FIG. 3 is a diagram showing a configuration example of a biometric information table according to the first embodiment.

DETAILED DESCRIPTION OF THE INVENTION

Hereunder, embodiments of the present invention are described in detail, with reference to the drawings.
<First Embodiment>

First, there is described a financial processing system including a device security management apparatus, according to a first embodiment.

Figure 1:
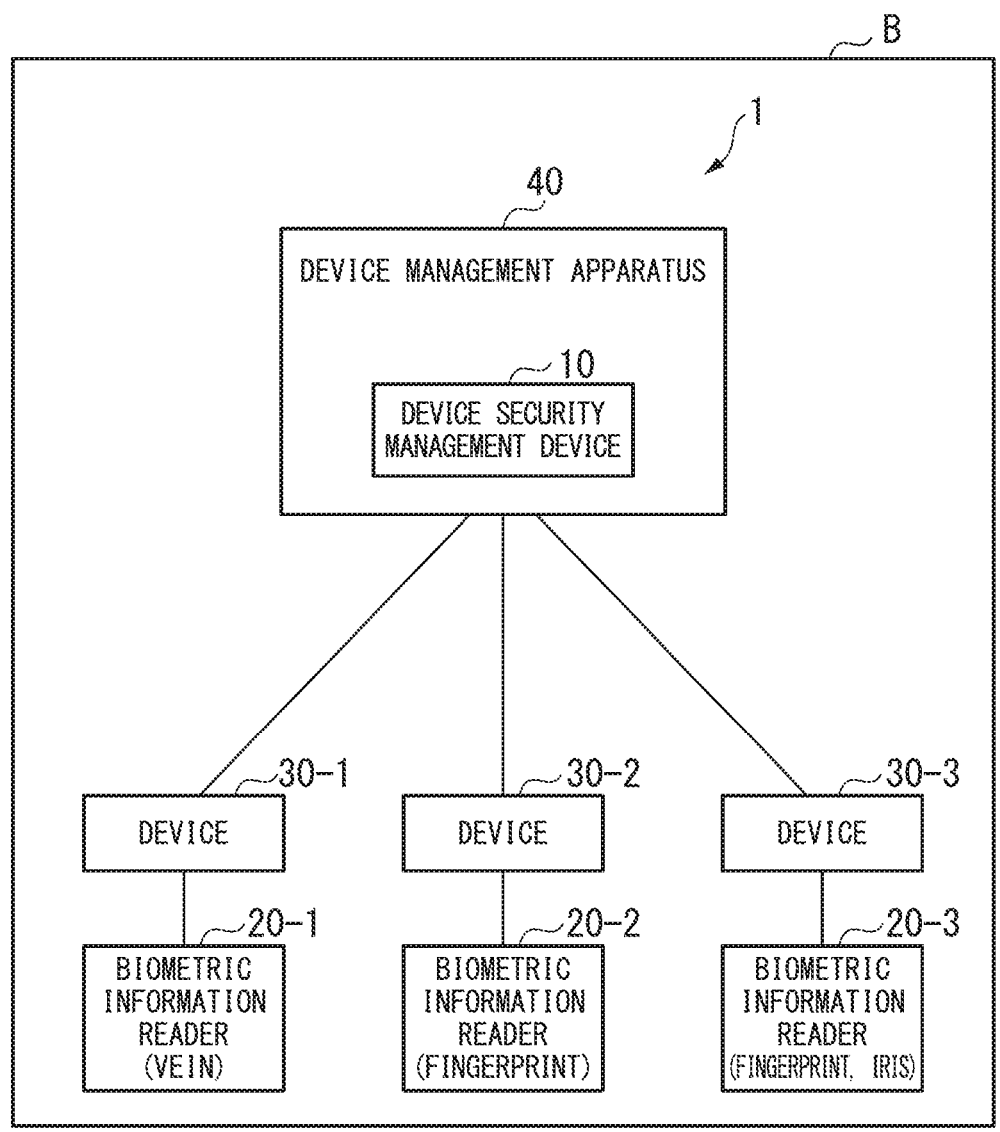
FIG. 1 is a diagram showing a configuration example of a financial processing system according to a first embodiment.

As shown in FIG. 1, a financial processing system 1 includes biometric information readers 20-1 to 20-3, devices 30-1 to 30-3, and a device management apparatus 40. In the following description, when each of the biometric information readers 20-1 to 20-3 does not have to be distinguished from each other, they are collectively referred to as biometric information readers 20. Similarly, when each of the devices 30-1 to 30-3 does not have to be distinguished from each other, they are collectively referred to as devices 30. Moreover, the numbers of the biometric information readers 20 and the devices 30 in the financial processing system 1 may be arbitrarily selected. As shown in FIG. 1, the device management apparatus 40 (that is, device security management apparatus 10 described later) may be installed in the same building B. Each device 30 may be separate and independent from the device management apparatus 40 (that is, device security management apparatus 10).

The devices 30 are devices such as a cash handling machine, a teller window operation machine, a key management device, and a photocopy machine, that are operated by an operator for performing various financial processes at a financial institution or the like. As shown in FIG. 1, for each of the devices 30 there is provided a biometric information reader 20 which is capable of reading biometric information.

The biometric information reader 20 is capable of reading biometric information related to physical characteristics of an operator, such as hand/finger vein information, fingerprint information, and iris information. For example, as shown in FIG. 1, a biometric information reader 20-1 is provided to the device 30-1, and may be capable of reading vein information. A biometric information reader 20-2 is provided in the device 30-2, and may be capable of reading fingerprint information. A biometric information reader 20-3 is provided to the device 30-3, and may be capable of reading fingerprint information and iris information. For a single device 30, there may be provided a biometric information reader 20 that is capable of reading several types of biometric information, and/or there may be provided a plurality of biometric information readers 20 that are capable of reading several different types of biometric information. The types of biometric information to be read by the biometric information readers 20 may be faceprint, voiceprint, and/or handwriting, in addition to those mentioned above.

The device management apparatus 40 includes a device security management apparatus 10 that controls whether or not to allow an operator to operate the devices 30. The device management apparatus 40 may be, for example, a teller machine that includes a terminal capable of operating as a server. The device management apparatus 40 and each device 30 are connected by an in-house network by means of a LAN (local area network), for example. The in-house network may be a network within the building B in which the device management apparatus 40 and the devices 30 are installed. The financial processing system 1 is a system that is formed by means of an in-house LAN at a financial institution. There is no need for the system 1 to be connected to a server outside the premises (building B) via an external network, in order to perform biometric authentication.

In a case where the device management apparatus 40 is a teller machine that includes a terminal, each functional part, which is described later, in the device security management apparatus 10 may be realized in the terminal.

Next, the configuration of the device security management apparatus 10 according to the first embodiment of the present invention is described.

Figure 2A:
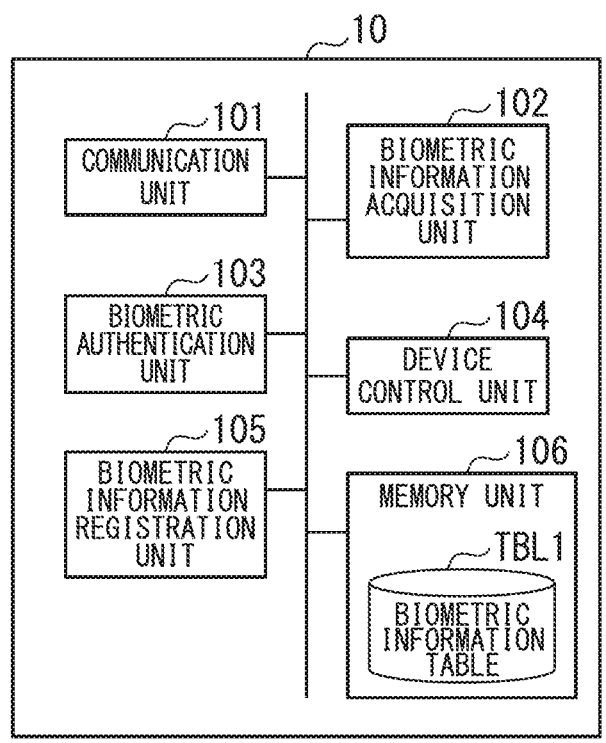
FIG. 2A is a diagram showing a configuration example of a device security management apparatus according to the first embodiment.

As shown in FIG. 2A, the device security management apparatus 10 includes a communication unit 101, a biometric information acquisition unit 102, a biometric authentication unit 103, a device control unit 104, a biometric information registration unit 105, and a memory unit 106.

The communication unit 101 is a network interface such as a LAN card for communicating with each of the devices 30 via an in-house network. For example, the communication unit 101 may transmit to a device 30, a transaction request that is accepted on the terminal by the operator, and may receive from the device 30, the result of processing related to this transaction. The biometric information reader 20 is connected to the device 30 by means of a USB (universal serial bus) connection, and the communication unit 101 may receive biometric information read by the biometric information reader 20, from the device 30 via the in-house network.

The memory unit 106 memorizes various types of information required for processes performed by the device security management apparatus 10. For example, as shown in FIG. 3, the memory unit 106 preliminarily memorizes a biometric information table TBL1 that stores biometric information of each operator as well as types of biometric information.

The biometric information registration unit 105, as the need arises such as when implementing the system 1 and/or when adding an operator, memorizes biometric information of the operator into the biometric information table TBL1 in the memory unit 106, while the biometric information is associated with an identifier of the operator and types of biometric information. For example, the biometric information registration unit 105 acquires biometric information of each operator acquired by the biometric information reader 20 provided with the device 30, along with the identifier of the operator. The biometric information registration unit 105 then acquires the type of this biometric information based on the file extension and/or header information of the biometric information. Then as illustrated with the biometric information table TBL1 shown in FIG. 3, the biometric information registration unit 105 associates the biometric information of the operator acquired by the biometric information reader 20, with the biometric information type and the identifier of the operator, and preliminarily records them into the memory unit 106. In a case where a biometric information reader 20 is provided also with the device management apparatus 40, the biometric information registration unit 105 may associate biometric information of an operator acquired by the biometric information reader 20, which is provided with the device management apparatus 40, with the identifier of the operator and the type of the biometric information, and may record them into the biometric information table TBL1 in the memory unit 106.

In the example shown in FIG. 3, vein information BI1a, fingerprint information BI1b, and iris information BI1c are registered for an operator with operator identifier UID1. Fingerprint information BI2b, iris information BI2c, and no vein information are registered for an operator with operator identifier UID2. Depending on the device 30 that is used by each operator, biometric information of the type required for authentication may be stored in the biometric information table TBL1.

When an operator starts using the device 30, or is in a similar situation, the biometric information acquisition unit 102 acquires biometric information of the operator read by the biometric information reader 20, along with the identifier of the device 30, from the device 30 via the communication unit 101. For example, the biometric information acquisition unit 102 may acquire vein information of a hand (finger or palm) of the operator. Moreover, the biometric information acquisition unit 102 may acquire fingerprint information of the operator. Furthermore, the biometric information acquisition unit 102 may acquire iris information of the operator. In a case where a plurality of biometric information readers 20 for reading different types of biometric information are provided in the device 30, the biometric information acquisition unit 102 may acquire several types of biometric information along with the device identifier. The device identifier may be a network address such as an IP address or a MAC address as long as each device 30 can be uniquely identified on this in-house network. Moreover, the biometric information acquisition unit 102 is capable of acquiring the type of biometric information from the file extension or header information of the biometric information.

The biometric authentication unit 103 checks the biometric information acquired by the biometric information acquisition unit 102 against the biometric information memorized in the biometric information table TBL1 of the memory unit 106, to thereby identify a matched operator. That is, the biometric authentication unit 103 compares the biometric information acquired by the biometric information acquisition unit 102 with the biometric information memorized in the biometric information table TBL1 of the memory unit 106, to thereby identify an operator corresponding to the biometric information acquired by the biometric information acquisition unit 102. In a case where several types of biometric information are memorized in the biometric information table TBL1, this information is checked against biometric information of the same type as the biometric information acquired by the biometric information acquisition unit 102 among the biometric information memorized in the biometric information table TBL1 of the memory unit 106. For example, in the case where the biometric information acquisition unit 102 acquires vein information, an operator that corresponds to the acquired vein information among the vein information of operators memorized in the biometric information table TBL1 is identified. In the case where the biometric information acquisition unit 102 acquires several types of biometric information, the biometric authentication unit 103 authenticates an operator by performing the above checking process on the acquired several types of biometric information. The level of security can be increased by combining several types of biometric information. Alternatively, in consideration of convenience, the operation may be carried out in a manner such that an operator is authenticated if any one of several types of biometric information is matched.

The device control unit 104 notifies the device 30 of control information (operation enabling signal) for bringing this device 30 into the operable state if an operator is identified in the biometric authentication unit 103. The operable state may mean that the device 30 allows the operator to perform various financial processes using the device 30. The device control unit 104 notifies the device 30 of control information (operation disabling signal) for bring this device 30 into the inoperable state an operator is not identified. The inoperable state may mean that the device 30 does not allow the operator to perform various financial processes using the device 30. For example, in the case where, an operator of operator identifier UID1 has the biometric information reader 20-1, which is connected to the device 30-1 shown in FIG. 1, to read their vein, the biometric authentication unit 103 identifies the operator of operator identifier UID1 and the device control unit 104 transmits to this device 30-1 control information that includes the operator identifier UID1 and an operation enabling signal. On the other hand, in the case where, an operator of operator identifier UID2 has the biometric information reader 20-1, which is connected to the device 30-1, to read their vein, the biometric authentication unit 103 cannot identify the operator (that is, the biometric authentication unit 103 identify no operator). Therefore, the device control unit 104 transmits to this device 30-1 control information that includes an operation disabling signal.

Next, the configuration of a device 30 according to the first embodiment of the present invention is described.

Figure 2B:
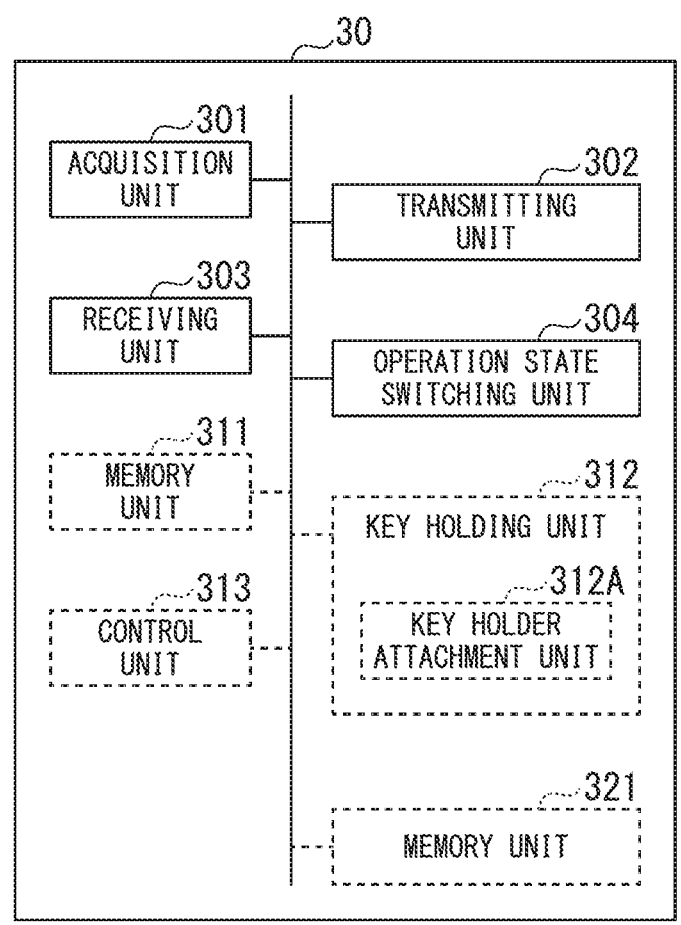
FIG. 2B is a diagram showing a configuration example of a device according to the first embodiment.

As shown in FIG. 2B, the device 30 includes an acquisition unit 301, a transmitting unit 302, a receiving unit 303, and an operation state switching unit 304.

The acquisition unit 301 acquires, from the biometric information reader 20 connected to the device 30, biometric information read by the biometric information reader 20. The transmitting unit 302 transmits the acquired biometric information to the device security management apparatus 10 via the in-house network. The receiving unit 303 receives control information from the device security management apparatus 20 via the in-house network. The operation state switching unit 304 brings the device 30 into the operable state in a case where the control signal includes the operation enabling signal. The operation state switching unit 304 brings the device 30 into the inoperable state in a case where the control signal includes the operation disabling signal.

Next, a process of the device security management apparatus 10 according to the first embodiment is described.

Figure 4:
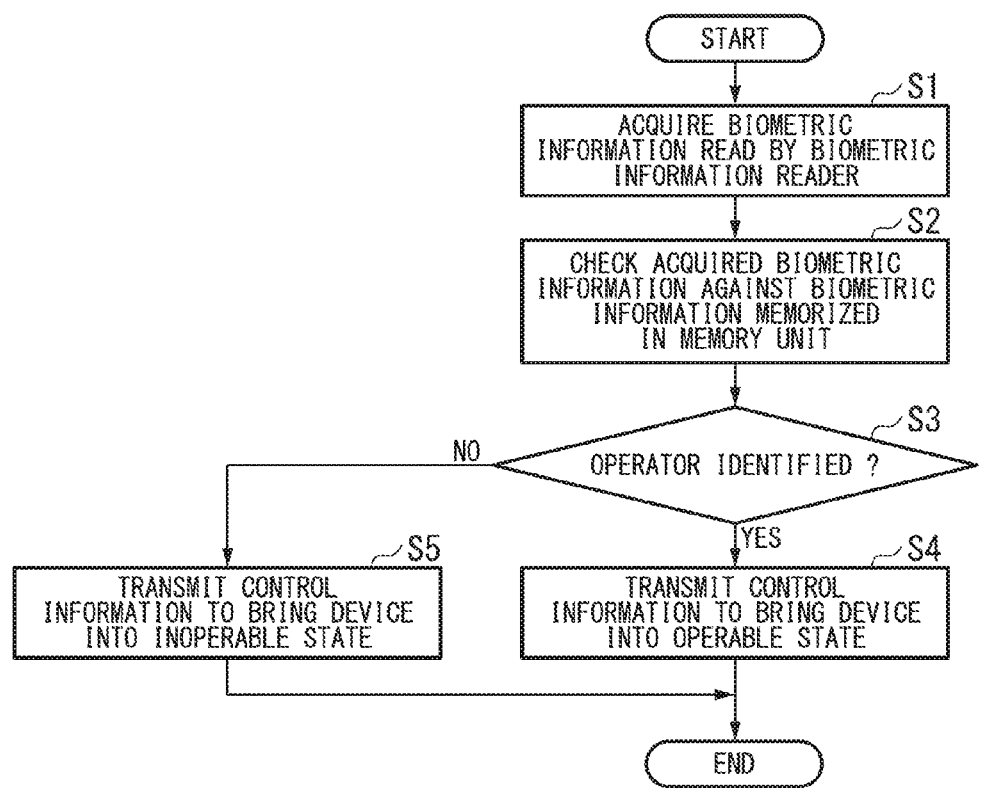
FIG. 4 is a diagram showing an example of a process flow of the device security management apparatus according to the first embodiment.

Here, a process flow of the device security management apparatus 10 shown in FIG. 4 is described, with an example of a case where the device management apparatus 40 serves as a teller machine including a terminal, and the device security management apparatus 10 is implemented on the terminal. Prior to the process flow of FIG. 4, as the need arises such as when implementing the system 1 and/or adding an operator, the biometric information registration unit 105 acquires biometric information read by the biometric information reader 20, and preliminarily records the biometric information of the operator and the type of the biometric information into the biometric information table TBL1 of the memory unit 106, while associating them with the identifier of the operator.

First, when the operator starts using the device 30, or is in a similar situation, the biometric information reader 20 provided with the device 30 reads the biometric information of the operator. For example, the biometric information reader 20 includes a hand-vein sensor, a fingerprint sensor, and/or an iris sensor, and an operator lets the sensors to read their hand vein, fingerprint, and/or iris. For example, in the case where the operator places their hand on the sensor that performs biometric authentication on the hand vein, the biometric information reader 20 detects the hand being placed thereon, and reads vein information of the hand of the operator. In the case where the operator places their finger on the sensor that performs biometric authentication on the fingerprint, the biometric information reader 20 detects the finger being placed thereon, and reads fingerprint information of the operator. In the case where the operator positions their face near the sensor that performs authentication on the iris, the biometric information reader 20 detects the positions of the eyes on the face, and reads the iris information of the operator. At this time, the biometric information reader 20 may provide the operator with guidance for reading each biometric information. The device 30 acquires the biometric information read by the biometric information reader 20, and transmits it along with the device identifier to the device security management apparatus 10.

The biometric information acquisition unit 102 acquires, from the device 30 via the communication unit 101, the biometric information read by the biometric information reader 20, and the device identifier (Step S1). Moreover, the biometric information acquisition unit 102 acquires the type of the biometric information from the file extension or header information of the biometric information. The biometric information acquisition unit 102 transmits the acquired biometric information, the type of the biometric information, and the device identifier, to the biometric authentication unit 103.

The biometric authentication unit 103 receives the biometric information, the type of the biometric information, and the device identifier, from the biometric information acquisition unit 102. The biometric authentication unit 103 checks the biometric information acquired from the biometric information acquisition unit 102 against the biometric information memorized in the biometric information table TBL1 of the memory unit 106 (Step S2). Specifically, the biometric authentication unit 103 reads, from the biometric information memorized in the biometric information table TBL1, the biometric information of each operator of the same type as the biometric information that is acquired by the biometric information acquisition unit 102, and checks each read biometric information against the acquired biometric information. For example, in the case where the biometric information table TBL1 is the data table shown in FIG. 3 and the type of acquired biometric information is vein, the biometric authentication unit 103 checks the acquired biometric information against the vein information BI1$a$ and so on of each operator in the biometric information table TBL1. If the type of biometric information is fingerprint, the biometric authentication unit 103 checks the acquired biometric information against the fingerprint information BI1$b$, BI2$b$, and so on of each operator in the biometric information table TBL1.

If, as a result of the above checking, the difference between the biometric information acquired by the biometric information acquisition unit 102 and the biometric information of an operator memorized in the biometric information table TBL1 falls within a range of a predetermined allowable margin, the biometric authentication unit 103 determines that the acquired biometric information matches with the biometric information of this operator. If, as a result of the above checking, the difference between the biometric information acquired by the biometric information acquisition unit 102 and the biometric information of an operator memorized in the biometric information table TBL1 does not fall within the range of a predetermined allowable margin, the biometric authentication unit 103 determines that the acquired biometric information does not match with the biometric information of this operator.

Regarding the biometric information of the type acquired by the biometric information acquisition unit 102, if the biometric authentication unit 103 determines that the acquired biometric information matches none of the biometric information of the operators recorded in the biometric information table TBL1 of the memory unit 106, identification of the operator is determined as failure (NO in Step S3), and it transmits information indicating this failure, and the device identifier acquired from the biometric information acquisition unit 102, to the device control unit 104.

Regarding the biometric information of the type acquired by the biometric information acquisition unit 102, if the biometric authentication unit 103 determines that the acquired biometric information matches the biometric information recorded in the biometric information table TBL1 of the memory unit 106, operator identification is determined as a success (YES in Step S3), and it transmits the identifier of the operator that has been determined as matched, and the device identifier acquired from the biometric information acquisition unit 102, to the device control unit 104. For example, in the case where the biometric information of the operator that has been determined as matched is biometric information BI1a, the biometric authentication unit 103 transmits to the device control unit 104, the identifier UID1 of the operator corresponding to the biometric information BI1a in the biometric information table TBL1, and the device identifier acquired from the biometric information acquisition unit 102 (for example, DID1). In the case where the biometric information of the operator that has been determined as matched is biometric information BI2b, the biometric authentication unit 103 transmits to the device control unit 104, the identifier UID2 of the operator corresponding to the biometric information BI2b in the biometric information table TBL1, and the device identifier acquired from the biometric information acquisition unit 102 (for example, DID1).

In the case where the operator identifier and the device identifier are received from the biometric authentication unit 103, the device control unit 104 transmits to the device 30 corresponding to the device identifier, control information that includes the operator identifier and the operation enabling signal for bringing this device 30 into an operable state (Step S4). However, in some cases, the control information may not include the operator identifier. On the other hand, in the case where information indicating operator identification failure, and the device identifier are received from the biometric authentication unit 103, the device control unit 104 transmits to the device 30 corresponding to the device identifier, control information that includes an operation disabling signal for bringing this device 30 into the inoperable state (Step S5).

Upon receiving the control information that includes the operator identifier and the operation enabling signal from the device control unit 104, the device 30 switches this device to the operable state, and starts recording log information of operations performed by the operator indicated by the operator identifier. On the other hand, upon receiving the control information including the operation disabling signal from the device control unit 104, the device 30 switches this device to the inoperable state. At this time, the operator may be notified of the biometric authentication failure by means of an alarm or a message.

As described above, according to the first embodiment, operator biometric information is managed in a centralized fashion on the device security management apparatus 10, and at the time of authentication, the checking process is performed using the biometric information of operators registered on the device security management apparatus 10. As a result, each device 30 only needs a biometric information reader 20 provided therewith, and there is no need for providing a biometric information authentication device in each device 30. Therefore it is possible to reduce implementation cost. Moreover, in the case where the system 1 includes a plurality of devices 30 that are respectively provided with biometric information readers for reading the same type of biometric information, operators need to register their biometric information of this type on the device security management apparatus 10 only once, and biometric information registration is not required on each device 30. As a result it is possible to reduce the level of operational load. Furthermore, by managing biometric information of operators in a centralized manner on the device security management apparatus 10, it is possible to avoid the risk of information leakage to the outside. Also, authentication by means of conventional operator's cards can be omitted. Therefore operators are no longer required to carry a card with them, and the level of convenience is improved.

Moreover, when biometric authentication is carried out, the financial processing system 1 is not required to have an online connection with an external server. Therefore it is possible to increase the level of security. Furthermore, the system configuration of the financial processing system 1 is formed within the premises (building) of a financial institution. Therefore there is no need for installing a large scale server outside the premises (building), and the terminal of a teller machine which is installed at the premises (building), is used as a substitute server. As a result, it is possible to realize the system 1 at low cost.

<Second Embodiment>

In a second embodiment of the present invention, in the device security management apparatus, device operation authority for each operator is further managed in a centralized manner, and in the case where an operator is identified in biometric authentication, then only if this operator has operation authority of the device, this device is controlled so as to be operable.

Figures 5, 6:
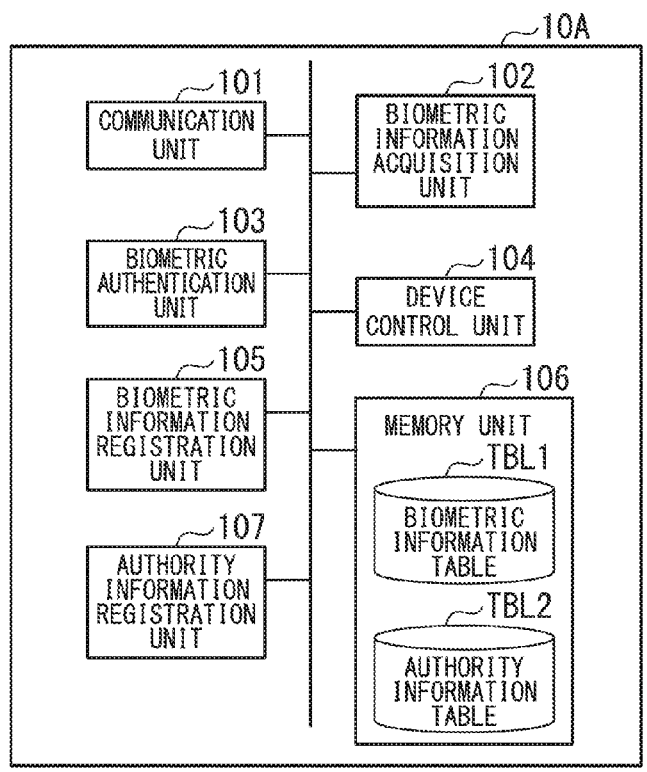
FIG. 5 is a diagram showing a configuration example of a device security management apparatus according to a second embodiment.
FIG. 6 is a diagram showing an example of an authority information table according to the second embodiment.

FIG. 5 is a configuration example of a device security management apparatus 10A according to the second embodiment. The device security management apparatus 10A includes an authority information registration unit 107 in addition to the respective functional units of the device security management apparatus 10 of the first embodiment. Moreover, the memory unit 106 further memorizes an authority information table TBL2 that indicates whether or not each operator has device operation authority. In the second embodiment, the configuration of the financial processing system is similar to that of the first embodiment. Therefore the following description will be made with reference to FIG. 1. Also, the portions that are the same as those in the first embodiment are given the same reference symbols, and detailed description thereof is omitted. Hereunder, the portions that differ from those in the first embodiment are specifically described.

The authority information registration unit 107, as the need arises such as when implementing the system 1 and when adding a device 30, memorizes operation authority of each operator for the device 30 in the authority information table TBL2 of the memory unit 106. For example, the authority information registration unit 107 acquires authority information related to operation of the device 30 for each operator, which is input by the administrator on the terminal. For example, as shown in FIG. 6, the authority information table TBL2 memorizes operator's operation authority for each device 30 (allow/deny), while associating it with the operator identifier and the device identifier. For example, FIG. 6 shows that the operator with operator identifier UID1 is allowed to operate devices 30 with device identifiers DID1 to DID4. The operator with operator identifier UID2 does not have operation authority for devices 30 with device identifiers DID1 and DID2, and is allowed to operate devices 30 with device identifiers DID3 and DID4. The authority information table TBL2 is used for the device control unit 104 to determine whether or not to allow an operator identified in the biometric authentication unit 103 to operate devices 30. Here, the device identifier DID1 may indicate the device 30-1. The device identifier DID2 may indicate the device 30-2. The device identifier DID3 may indicate the device 30-3.

In the case where the biometric authentication unit 103 identifies an operator, the device control unit 104, based on the authority information table TBL2 of the memory unit 106, reads operation authority that corresponds to the identifier of this operator, and the device identifier acquired by the biometric information acquisition unit 102, and determines whether or not to allow this operator to operate this device 30. For example, in the case where an operator of operator identifier UID1 has the biometric information reader 20-2, which is connected to the device 30-2 shown in FIG. 1, to read their fingerprint, the biometric authentication unit 103 identifies the operator of operator identifier UID1, and the device control unit 104 transmits to this device 30-2 control information that includes the operator identifier UID1 and an operation enabling signal. On the other hand, in the case where an operator of operator identifier UID2 has the biometric information reader 20-2, which is connected to the device 30-2, to read their fingerprint, the biometric authentication unit 103 identifies the operator of the operator identifier UID2. However, in the authority information table TBL2, the operation authority that corresponds to the combination of the operator identifier UID2 and the device identifier DID2 is "deny". Therefore the device control unit 104 transmits control information that includes an operation disabling signal to this device 30-2.

Figures 7, 8:
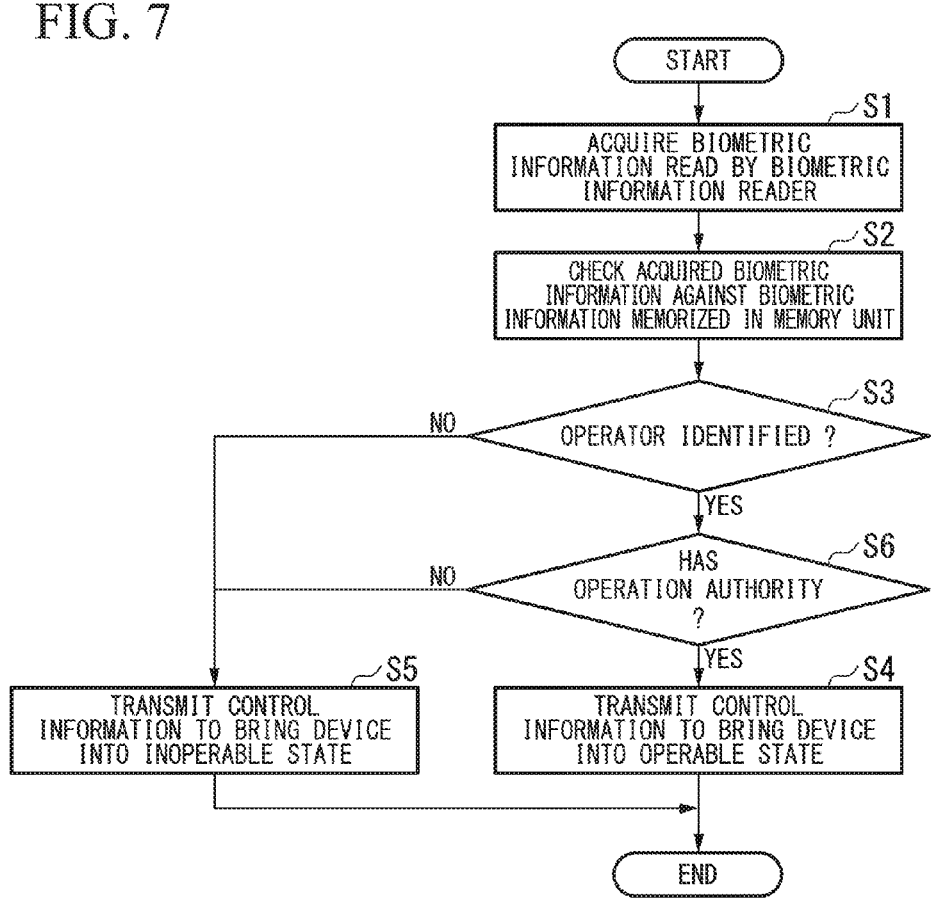
FIG. 7 is a diagram showing an example of a process flow of the device security management apparatus according to the second embodiment.
FIG. 8 is a diagram showing a modified example of an authority information table according to the second embodiment.

Next, a process of the device security management apparatus 10A according to the second embodiment is described. As with the first embodiment, a process flow of the device security management apparatus 10A shown in FIG. 7 is described, with an example of a case where the device management apparatus 40 serves as a teller machine including a terminal, and the device security management apparatus 10A is implemented on the terminal. Prior to the process flow of FIG. 7, as the need arises such as when implementing the system 1 and/or adding an operator, the biometric information registration unit 105 acquires biometric information read by the biometric information reader 20, and preliminarily records the biometric information of the operator and the type of the biometric information into the biometric information table TBL1 of the memory unit 106, while associating them with the identifier of the operator. Furthermore, the authority information registration unit 107, as the need arises such as when implementing the system 1 and/or adding an operator or a device 30, preliminarily records device operation authority of each operator in the authority information table TBL2 of the memory unit 106 while associating it the operator identifier and the device identifier.

In the process flow shown in FIG. 7, processes similar to those in FIG. 4 of the first embodiment are performed in Step S1 to Step S3. Therefore processes from Step S6, which are added in FIG. 7 are described here. In Step S3, regarding the biometric information of the type acquired by the biometric information acquisition unit 102, if the biometric authentication unit 103 determines that the acquired biometric information matches the biometric information recorded in the biometric information table TBL1 of the memory unit 106, operator identification is determined as a success (YES in Step S3). Then, the biometric authentication unit 103 transmits the identifier of the operator that has been determined as matched, and the device identifier acquired from the biometric information acquisition unit 102, to the device control unit 104.

Upon receiving the operator identifier and the device identifier from the biometric authentication unit 103, the device control unit 104 determines, based on the authority information table TBL2 of the memory unit 106, whether or not operation authority is given for the device 30 that corresponds to the identifier of this operator and the identifier of this device 30 (Step S6). In the case where the authority information table TBL2 is the data table shown in FIG. 6, and the operator identifier UID1 and the device identifier DID2 are received from the biometric authentication unit 103, the device control unit 104 determines, based on the authority information table TBL2 of the memory unit 106, that the operator of the operator identifier UID1 is allowed to operate the device 30 (30-2) of the device identifier DID2. On the other hand, in the case where the operator identifier UID2 and the device identifier DID2 are received from the biometric authentication unit 103, the device control unit 104 determines, based on the authority information table TBL2 of the memory unit 106, that the operator of the operator identifier UID1 is not allowed to operate the device 30 (30-2) of the device identifier DID2.

If operation is determined as being allowed in the above determination (YES in Step S6), the device control unit 104 transmits to the device 30 corresponding to this device identifier, control information that includes the operator identifier and an operation enabling signal, which brings this device into the operable state (Step S4). On the other hand, if operation is determined as being denied in the above determination (NO in Step S6), the device control unit 104 transmits to the device 30 corresponding to this device identifier, control information that includes an operation disabling signal, which brings this device into the inoperable state (Step S5).

Upon receiving the control information that includes the operator identifier and the operation enabling signal from the device control unit 104, the device 30 switches this device to the operable state, and starts recording log information of operations performed by the operator indicated by the operator identifier. On the other hand, upon receiving the control information including the operation disabling signal from the device control unit 104, the device 30 switches this device to the inoperable state. In the case where an operation disabling signal as well as information that indicates operation authority being denied are received from the device control unit 104, the operator may be notified of operation authority denial by means of an alarm or a message.

<Modified Example>

As a modified example of the second embodiment, the authority information table TBL2 may be configured as the authority information table TBL2A of FIG. 8. In the case where the range of functions of the device 30 allowed to be operated varies according to operator's operation ranking on the device 30, for which operation authority is given, the authority information registration unit 107 may further memorize operation ranking while associating it with operator identifiers and device identifiers. Here, the term "operation ranking" refers to the level of operation authority of an operator for a device 30, and for example, it may be set in descending order according to authority such as operation ranking A (special), operation ranking B (clerk), and operation ranking C (general). Moreover, in the case where the device 30 is a photocopy machine that does not require operation authority distinction, its operation ranking may be set as "no operation ranking". "no operation ranking" means that an operation ranking is not set. As shown in FIG. 8, for example, the operator with operator identifier UID1 is registered as being operation ranking A (special) for the devices 30 (30-1 and 30-2) with device identifiers DID1 and DID2, operation ranking B (clerk) for the device 30 (30-3) with device identifier DID3, and "no operation ranking" for the device with device identifier DID4. The operator with operator identifier UID2 is registered as having no operation authority for the devices 30 (30-1 and 30-2) with device identifiers DID1 and DID2, as having operation ranking C (general) for the device 30 (30-3) with device identifier DID3, and "no operation ranking" for the device 30 with device identifier DID4.

In this case, in Step S4 of FIG. 7, for example, the device control unit 104 transmits to the device 30 that has been determined as being operable by the operator, control information that includes the identifier of this operator, the operation enabling signal, and the operation ranking. If the operation ranking of the device 30 is registered as "no operation ranking", control information that includes the identifier of this operator, and an operation enabling signal is transmitted. Upon receiving the operator identifier, the operation enabling signal, and the operation ranking from the device control unit 104, the device 30 is brought into the state where operations are allowed within the function range according to the received operation ranking, and the device 30 starts recording log information of operations performed by the operator indicated by the operator identifier.

Examples of the devices 30 may include a key management device, a teller machine, a teller window machine, and a photocopy machine. Individual operations of each device 30 at the time of receiving an operator identifier, an operation enabling signal, and an operation ranking from the device control unit 104, are described in detail below.

For example, in the case where the device 30 is a key management device, the key management device includes a memory unit 311 (see FIG. 2B) that records data related to the state of keys having been taken out and/or having been returned. Moreover, this memory unit 311 memorizes key identification information of keys that are held so as to correspond to all key holding units 312 (see FIG. 2B) in a one-on-one manner, and identification information of all operators that are allowed to handle the keys. Furthermore, the memory unit 311 memorizes key identification information of keys that can be taken out according to the operation ranking for each operator's information. Here, in the case where operation rankings are employed, they include, for example, general staff, teller, behind-counter staff, and management staff. The memory unit 311 memorizes key identification information that indicates which keys can be taken out for each operation ranking. In the case where keys that can be taken out vary between operators even for the same operation ranking, the memory unit 311 memorizes identification information for each operator identification information. The memory unit 311 may further memorize key identification information that indicates keys that require approval of a superior staff for them to be taken out. When an operator identifier, an operation enabling signal, and an operation ranking are received from the device control unit 104, a control unit 313 (see FIG. 2B) of the key management device checks the received data against the master data recorded on the memory unit 311 of the key management device. If the control unit 313 has determined that operator identification information is appropriate, the control unit 313 causes a lamp to light on the key holding unit 312 that holds the key having the key identification information that indicates the key being allowed to be taken out for the identifier of this operator. If this operator operates the take-out button, the control unit 313 then releases the locked state of a key holder attachment unit 312A (see FIG. 2B) of this key holding unit 312, and starts recording log information of operations performed by the operator indicated by the operator identifier.

Upon the locked state of key holder attachment unit 312A being released, the operator takes out the key from the key holding unit 312. Understandably, even if the take-out buttons of key holding units 312 other than the one with the lit lamp are operated, the control unit 313 will not release the locked state of the key holder attachment unit 312A of this key holding unit 312.

For example, in the case where the device 30 is a teller machine, the teller machine includes a memory unit 321 (see FIG. 2B) that records data of available cash quantity in the machine, which relates to fund management, and operation log data, which relates to operations of each transaction. Moreover, this memory unit 321 memorizes identification information of all operators that perform operation of the teller machine, and device operation information that indicates which operation is allowed on this machine according to operation ranking. Here, in the case where operation rankings are employed, they include, for example, general staff, teller, behind-counter staff, and management staff. The memory unit 321 memorizes information of the operations of the teller machine that are allowed to be performed, for each operation ranking.

For example, for a general staff, among various operations of a teller machine, operations may be restricted to deposit-withdrawal processes and bill organization, and the maximum amount of withdrawal may be limited, in some cases. Also, allowed device operations for a teller differ from those for a general staff. For example, regarding a teller, withdrawal can be made without the maximum withdrawal amount being limited. Furthermore, the operation ranking of the behind-counter staff allows operations with higher ranking responsibilities. For example, the behind-counter staff are allowed to perform operations such as restocking/recovering of transaction fund cash between the institution and a fund provider as a fund transfer process. Moreover, the management staff operation ranking allows all of the device operations including cash cassette recovery.

Staff members of the same operation ranking need not have exactly the same allowed device operations, and even for the same operation ranking, different device operations may be assigned to each operator and may be set finely.

Moreover, the memory unit that configures the teller machine need not be provided in the same device as the teller machine, and for example, it may be provided in the memory unit of the terminal that performs device management in some cases.

Even in a case where the device 30 is a device other than those devices mentioned above, the device control unit 104 restricts operations that can be performed by this operator and causes them to perform operations, according to the operation ranking received.

Furthermore, operations do not always have to be divided by several operation rankings. For example, in some cases there may not be an operation ranking limitation, and all operations of a device, such as a photocopy machine, may be allowed as long as an operation enabling signal is received.

As described above, according to the second embodiment, an effect similar to that of the first embodiment can be achieved, and operation authority of each operator can be managed in a centralized manner in the device security management apparatus 10A. Therefore, the need for registering operator's operation authority on each device 30 is eliminated, and the level of operational load can be reduced. Furthermore, by registering operation rankings of operators on the device security management apparatus 10A, the device 30 can be switched between operable states within the range of functions according to the operation ranking.

In the embodiments of the present invention, the biometric information reader 20 performs several types of biometric authentication such as biometric authentication by means of hand vein, biometric authentication by means of fingerprint, and biometric authentication by means of iris. However, it is not limited to this. All of the biometric information readers 20 may perform the same type of biometric authentication. Also, each of the biometric information readers 20 provided with several devices 30 may perform different types of biometric authentication.

Furthermore, in the embodiments of the present invention, the financial processing system 1 is described as including a plurality of devices 30 as shown in FIG. 1. However, the configuration is not limited to this. The financial processing system 1 may include a single device 30. In this case, since the type of operator's biometric information is preliminarily known, the biometric information acquisition unit 102 need not transmit the type of operator's biometric information to the biometric authentication unit 103 in the process of Step S1, provided that the type of operator's biometric information is preliminarily given to the biometric authentication unit 103.

Moreover, in the embodiments of the present invention, the biometric information registration unit 105 is described as one that records operator's biometric information in the memory unit 106 provided in the device security management apparatus 10. However, the configuration is not limited to this. Each memory unit in the embodiments of the present invention such as a hard drive and memory may be provided anywhere within a range where appropriate information transmission/reception are performed. Also, the memory unit such as a hard drive and memory may exist as several units within a range where appropriate information transmission/reception are performed, and data may be memorized in a distributed manner. For example, the biometric information registration unit 105 may record an operator's biometric information in the memory unit provided in the device 30 and/or the biometric information reader 20.

However, in the case where the biometric information reader 20 is provided with the device management apparatus 40, and the biometric information registration unit 105 records the operator's biometric information acquired by the biometric information reader 20, into the memory unit 106 provided in the device security management apparatus 10, the operator's biometric information is managed within a single device of the device management apparatus 40. Therefore the level of security can be increased.

The process flow in the embodiments of the present invention may have the order of processes switched, within a range where appropriate processes are performed.

A device security management apparatus according to an embodiment of the present invention includes: a communication unit that communicates with a device, via a network within a building in which the security management apparatus and the device are installed, the device being used for financial processing; a memory unit that memorizes biometric information for each of a plurality of operators; a biometric information acquisition unit that acquires biometric information from the device via the communication unit; a biometric authentication unit that compares the acquired biometric information with the memorized biometric information, to identify an operator corresponding to the acquired biometric information; and a device control unit that notifies the device of first control information for bringing the device into an operable state in a case where the biometric authentication unit has identified the operator corresponding to the acquired biometric information, the device control unit notifying the device of second control information for bringing the device into an inoperable state in a case where the biometric authentication unit has not identified the operator corresponding to the acquired biometric information.

In the above-described device security management apparatus, the memory unit may memorize a plurality of types of biometric information for each of the operators; and the biometric authentication unit may compare the acquired biometric information with biometric information whose type is same as the type of the acquired biometric information among the memorized plurality of types of biometric information.

In the above-described device security management apparatus, the memory unit may further memorize authority information indicating whether authority to operate the device is given for each of the operators, the device control unit may determine whether the operator corresponding to the acquired biometric information is authorized to operate the device based on the memorized authority information, in a case where the biometric authentication unit has identified the operator corresponding to the acquired biometric information, the device control unit may notify the device of the first control information, in a case where the device control unit has determined that the operator corresponding to the acquired biometric information is authorized to operate the device, and the device control unit may notify the device of the second control information, in a case where the device control unit has determined that the operator corresponding to the acquired biometric information is not authorized to operate the device.

In the above-described device security management apparatus, the memory unit may further memorize an operation ranking indicating which operation on the device is authorized for an operator who is authorized to operate the device, and the device control unit may notify the device of the first control information including the memorized operation ranking, in a case where the device control unit has determined that the operator corresponding to the acquired biometric information is authorized to operate the device.

In the above-described device security management apparatus, the acquired biometric information may biometric information read by a biometric information reader.

The embodiments of the present invention have been described. The device security management apparatus 10 (10A) mentioned above has a computer system therein. The above process steps are memorized in a program format on a computer-readable memory unit, and the above processes are performed by executing this program on a computer. Here, the term "computer-readable memory unit" refers to a magnetic disk, magnetic optical disk, CD-ROM, DVD-ROM, and semiconductor memory. The device management apparatus 40 may include a computer-readable memory unit. If the device management apparatus 40 includes a computer-readable memory unit, the amount of access to/from other devices can be reduced, and the level of security can be increased. This computer program may be distributed to a computer via a communication line, and the computer that has received this distribution may execute this program.

Moreover, the above program may be one that realizes part of the functions described above. Furthermore, the program may be a difference file (difference program) that can realize the above functions in combination with a program already recorded on the computer system.

Some embodiments of the present invention have been described. However, these embodiments are presented as examples only, and are not to limit the scope of the invention. Moreover various omissions, substitutions, and/or modifications may be made without departing from the scope of the invention.

What is claimed is:

1. A device security management apparatus comprising:
   a communication unit that communicates with a device, via a network within a building in which the security management apparatus and the device are installed, the device being separated from and independent of the device security management apparatus, and the device being used for financial processing;

a memory unit that memorizes biometric information for each of a plurality of operators;

a biometric information acquisition unit that acquires biometric information from the device via the communication unit;

a biometric authentication unit that compares the acquired biometric information with the memorized biometric information, to identify an operator corresponding to the acquired biometric information; and a device control unit that notifies the device of first control information for bringing the device into an operable state in a case where the biometric authentication unit has identified the operator corresponding to the acquired biometric information, the device control unit notifying the device of second control information for bringing the device into an inoperable state in a case where the biometric authentication unit has not identified the operator corresponding to the acquired biometric information.

2. The device security management apparatus according to claim 1, wherein the memory unit memorizes a plurality of types of biometric information for each of the operators; and the biometric authentication unit compares the acquired biometric information with biometric information whose type is same as the type of the acquired biometric information among the memorized plurality of types of biometric information.

3. The device security management apparatus according to claim 1, wherein the memory unit further memorizes authority information indicating whether authority to operate the device is given for each of the operators, the device control unit determines whether the operator corresponding to the acquired biometric information is authorized to operate the device based on the memorized authority information, in a case where the biometric authentication unit has identified the operator corresponding to the acquired biometric information, the device control unit notifies the device of the first control information, in a case where the device control unit has determined that the operator corresponding to the acquired biometric information is authorized to operate the device, and the device control unit notifies the device of the second control information, in a case where the device control unit has determined that the operator corresponding to the acquired biometric information is not authorized to operate the device.

4. The device security management apparatus according to claim 3, wherein the memory unit further memorizes an operation ranking indicating which operation on the device is authorized for an operator who is authorized to operate the device, and the device control unit notifies the device of the first control information including the memorized operation ranking, in a case where the device control unit has determined that the operator corresponding to the acquired biometric information is authorized to operate the device.

5. The device security management apparatus according to claim 1, wherein the acquired biometric information is biometric information read by a biometric information reader.

6. The device security management apparatus according to claim 1, wherein the memory unit further memorizes an operation ranking indicating which operation on the device is authorized for an operator who is authorized to operate the device, and the device control unit notifies the device of the first control information including the memorized operation ranking, in a case where the device control unit has determined that the operator corresponding to the acquired biometric information is authorized to operate the device.

7. The device security management apparatus according to claim 1, wherein the network includes a local area network (LAN).

8. A financial processing system comprising:

a device security management apparatus; and a device that is separated from and independent of the device security management apparatus, and that is used for financial processing, the device including:

a transmitting unit that transmits biometric information via a network within a building in which the security management apparatus and the device are installed, the device security management apparatus including:

a communication unit that communicates with the device, via the network within the building;

a memory unit that memorizes biometric information for each of a plurality of operators;

a biometric information acquisition unit that acquires the biometric information transmitted from the device, via the communication unit;

a biometric authentication unit that compares the acquired biometric information with the memorized biometric information, to identify an operator corresponding to the acquired biometric information; and a device control unit that notifies the device of first control information for bringing the device into an operable state in a case where the biometric authentication unit has identified the operator corresponding to the acquired biometric information, the device control unit notifying the device of second control information for bringing the device into an inoperable state in a case where the biometric authentication unit has not identified the operator corresponding to the acquired biometric information, the device further including:

a receiving unit that receives the first control information or the second control information from the device security management apparatus via the network within the building; and an operation state switching unit that brings the device into the operable state in a case where the receiving unit has received the first control information, the operation state switching unit bringing the device into the inoperable state in a case where the receiving unit has received the second control information.

9. The financial processing system according to claim 8, wherein the memory unit further memorizes an operation ranking indicating which operation on the device is authorized for an operator who is authorized to operate the device, and the device control unit notifies the device of the first control information including the memorized operation ranking, in a case where the device control unit has determined that the operator corresponding to the acquired biometric information is authorized to operate the device.

10. The financial processing system according to claim 8, wherein the network includes a local area network (LAN).

11. A device security management method for a device security management apparatus, the method comprising:
   memorizing biometric information for each of a plurality of operators in a memory unit of the device security management apparatus, the step being performed by the device security management apparatus;
   acquiring biometric information from a device, via a network within a building in which the security management apparatus and the device are installed, the step being performed by the device security management apparatus, the device being separated from and independent of the device security management apparatus, and the device being used for financial processing;
   comparing the acquired biometric information with the memorized biometric information, to identify an operator corresponding to the acquired biometric information the step being performed by the device security management apparatus;
   notifying the device of first control information for bringing the device into an operable state in a case where the operator corresponding to the acquired biometric information has been identified, the step being performed by the device security management apparatus; and
   notifying the device of second control information for bringing the device into an inoperable state in a case where the operator corresponding to the acquired biometric information has not been identified, the step being performed by the device security management apparatus.

12. The device security management method according to claim 11, further comprising:
   further memorizing, in the memory unit of the device security management apparatus, an operation ranking indicating which operation on the device is authorized for an operator who is authorized to operate the device, the step being performed by the device security management apparatus; and
   notifying the device of the first control information including the memorized operation ranking, in a case where the device control unit has determined that the operator corresponding to the acquired biometric information is authorized to operate the device, the step being performed by the device security management apparatus.

13. The device security management method according to claim 11, wherein the network includes a local area network (LAN).

14. A non-transitory computer-readable recording medium storing a program for causing a computer to operate as a device security management device, the program causing the computer to execute:
   memorizing biometric information for each of a plurality of operators in the computer;
   acquiring biometric information from a device, via a network within a building in which the computer and the device are installed, the device being separated from and independent of the computer, and the device being used for financial processing;
   comparing the acquired biometric information with the memorized biometric information, to identify an operator corresponding to the acquired biometric information;
   notifying the device of first control information for bringing the device into an operable state in a case where the operator corresponding to the acquired biometric information has been identified; and
   notifying the device of first control information for bringing the device into an inoperable state in a case where the operator corresponding to the acquired biometric information has not been identified.

15. The recording medium according to claim 14, wherein the program causes the computer to execute:
   further memorizing, in the computer, an operation ranking indicating which operation on the device is authorized for an operator who is authorized to operate the device; and
   notifying the device of the first control information including the memorized operation ranking, in a case where the device control unit has determined that the operator corresponding to the acquired biometric information is authorized to operate the device.

16. The recording medium according to claim 14, wherein the network includes a local area network (LAN).

* * * * *